UNITED STATES PATENT OFFICE.

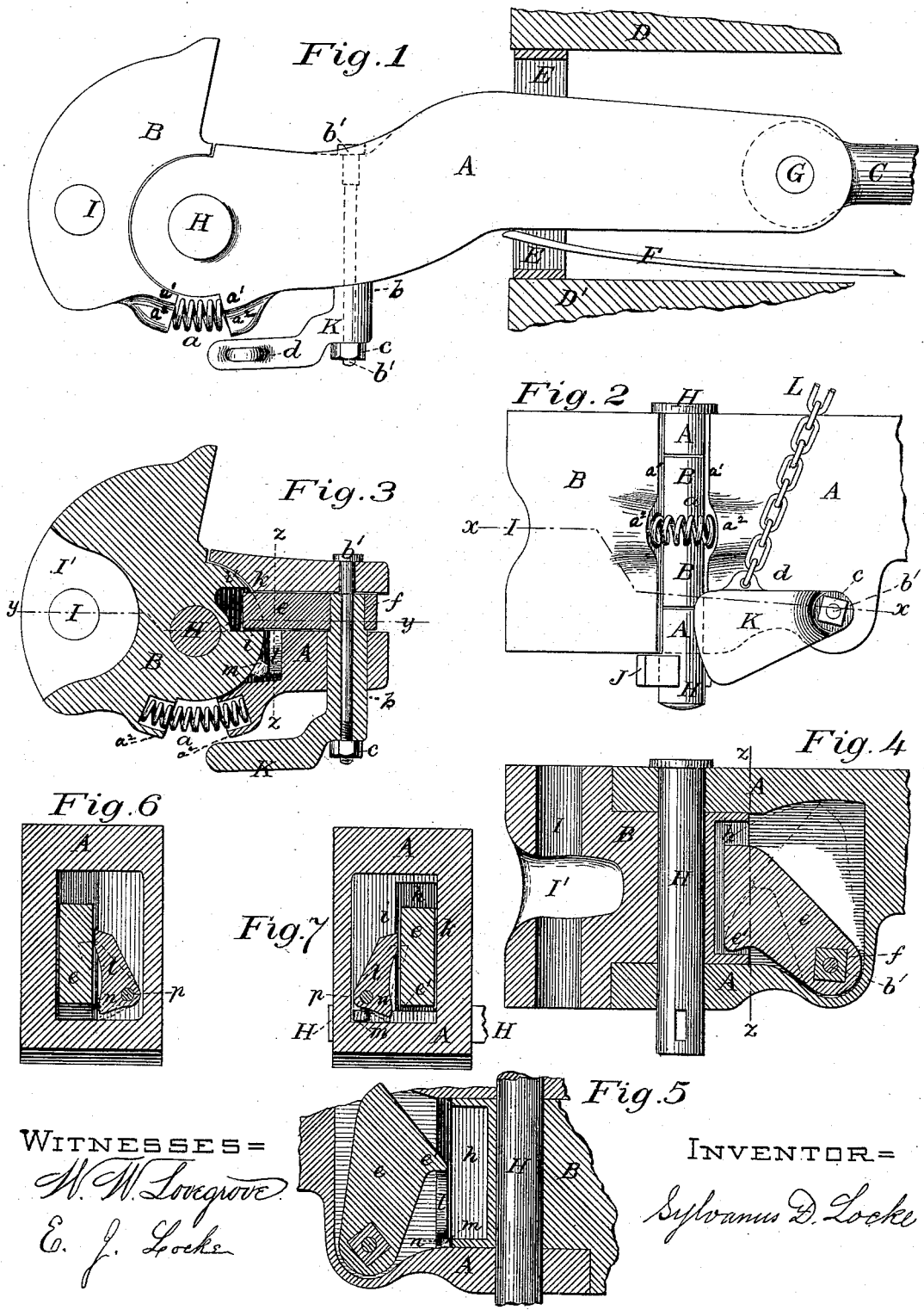

SYLVANUS D. LOCKE, OF HOOSICK FALLS, NEW YORK.

CAR-COUPLING.

SPECIFICATION forming part of Letters Patent No. 376,387, dated January 10, 1888.

Application filed March 4, 1887. Serial No. 229,702. (No model.)

*To all whom it may concern:*

Be it known that I, SYLVANUS D. LOCKE, of Hoosick Falls, in the county of Rensselaer and State of New York, have invented certain new and useful Improvements in Car-Couplings, of which the following is a specification.

My invention relates to that class of car-couplers called "hook couplers," that have the hook pivoted on the stem or draw-bar part; and it consists, first, in the application thereto of a spring to automatically close the hook when the cars separate and it is released from engagement with the hook on the other car; second, in the employment therein of a pawl or other detent to automatically hold and prevent re-engagement of the key or other mechanism that locks the hook to the stem when lifted or moved out of its locking position; third, in the employment of a finger or other tripping mechanism on the hook that, when the hook has opened so far as to prevent its re-engagement with the key, shall trip the pawl to allow the key to again lock the hook when the latter is closed, and, fourth, in such other combinations and details of construction as are herein set forth and described.

In the drawings, Figure 1 is a top view of a hook coupler with my improvements attached. Fig. 2 is a side view of the same, showing the back side of the hook. Fig. 3 is a horizontal section of the same on the line $x\ x$, Fig. 2. Fig. 4 is a longitudinal vertical section of the same on the line $y\ y$, Fig. 3, looking to the right or toward the face of the hook. Fig. 5 is the same as Fig. 4, looking toward the back of the hook. Fig. 6 is a cross-section on the line $z\ z$, Fig. 4, looking to the right; and Fig. 7 is a cross-section on the line $z\ z$, Fig. 4, looking to the left.

Like letters refer to like parts.

A is the stem or draw-bar part, and B the hook, draw-head, buffer, and part of a hook coupler, that is connected by a "tail-pin," C, or other device, in any suitable manner, to the car, and is ordinarily supported between timbers D D′ by a yoke, E. When in engagement with the hook of another car, it is held in such engagement by a spring, F, in substantially the position shown in Fig. 1, midway between the timbers D and D′. This spring yields to allow the hooks to pass to engage, and when not in engagement the hook is driven by the spring over against the yoke or other stop on the timber D.

The stem is pivoted to the tail-pin on a pin, G, and the hook is pivoted or hinged to the stem on the pin H. The draw-head or hook B is provided with a pin-hole, I, and a link-socket, I′, for shackling to another car by the ordinary pin and link. The pivot-pin H is secured against accidental withdrawal by a key, J.

The parts so far described are those in ordinary use, and may be varied or changed as is desired or convenient.

The hook B opens until the shoulder $a'$ thereon strikes the shoulder $a'$ on the stem A. The opening of the hook is far enough to allow it to slip out of engagement with its opposing hook on another car and the two cars to separate when desired. After the hook has disengaged and the cars separated, it is desirable to close the hook again immediately, so that it may be ready to re-engage whenever it is desired to couple another car thereto, and particularly when it is desired to couple with another car having a link-and-pin coupler. I close it automatically by a spring, $a$, seated in the socketed embossments $a^2\ a^2$ on the shoulders $a'\ a'$. When the hook opens, the spring is compressed together. When the cars separate and as soon as the hook is disengaged, the action of the spring forcibly closes it.

I do not limit my invention to this form or application of a spring, but consider any form of spring applied in any manner for the purpose of closing the hook as coming within the scope of my invention.

K is a lever having a shaft part, $b$, seated in the stem A. This is lifted or turned on the shaft $b$ by a chain or other connection running to a suitable uncoupling-lever (or levers) on the car. These uncoupling-levers (or lever) may be of any desired form. One form is shown in Patent No. 351,385, issued to me October 26, 1886, to which patent reference is here made for a more specific description of the levers. The inner end of the shaft $b$ is squared and receives on the square portion $f$ a key, $e$, that plays freely up and down in a mortise or chamber in the stem A. (Shown in several of the figures.) This key is held on the shaft $b$ by the side walls of the chamber, and the shaft is held in place by the bolt $b'$ and nut $c$. The key, being squared on the shaft, partakes of the movement of the lever K, rising or swinging up on its pivots $b$ $b'$ when the lever is raised and falling or swinging down when the lever falls. This key, being heavy at its forward end and pivoted well back, tends to fall when the lever is released. To make it possibly more certain of falling the lever K may be weighted, as shown, or their falling may be urged by a spring.

In the circular or hinge part of the hook is a chamber, $h$, into which, when the hook is closed, the key $e$ falls, to lock the hook to the stem, as shown in Figs. 3 and 4, the part $i$ of the hinge of the hook striking against the key as the hook attempts to swing open.

A pawl, $l$, is pivoted at $p$, so as to gravitate forward and down, and rests with its head against the side face of the key when the latter is down, as shown in Figs. 3, 6, and 7. When the key is raised out of the chamber $h$ to a position slightly above that shown by the dotted lines in Fig. 4 or the full lines in Fig. 5, the pawl swings forward to the position shown by dotted lines in Figs. 6 and 7, and its head falls under the end $e'$ of the key, so holding the latter from falling into the chamber $h$ and relocking the hook. The heel $n$ of the pawl, when the latter is holding the key, projects down into the path of a tripping ledge or finger, $m$, on the hook, that, as the hook opens to allow the cars to uncouple, is driven underneath this heel, so swinging the pawl on its pivot out of engagement with the key and allowing the latter to fall against the circular face of the part $i$ of the hook, where it rests, below the point of re-engagement with the pawl, until the cars are uncoupled, when, the spring $a$ closing the hook, the key slides along the face of $i$ and falls into the chamber $h$, thereby automatically relocking the hook.

The retaining-pawl $l$ is preferably pivoted on the stem A. It may be made of any desired form and be actuated by a spring instead of by gravity, or by both a spring and gravity.

I prefer to use with a gravitating pawl a tripping ledge or finger cast on the hook, as described; but any form or kind of tripping device or trip mechanism may be used.

I do not limit my invention of the retaining-pawl or automatic key-holding mechanism to the use therewith of trip mechanism, for the latter may be entirely dispensed with. By locating the pawl on the part $i'$ of the hook (the part $k$ of the stem being chambered out to let it pass) immediately forward of and so it will gravitate against the key and swing underneath it as it rises, the pawl will be carried by the hook as it opens out from under the key, so allowing the latter, without the use of a tripping device, to fall upon the face of the part $i$, and from thence, when the hook closes, into the chamber $h$. I prefer, however, to use a tripping device, as the chambering of the part $k$ weakens the stem and lessens the support for the key.

It is evident that the pawl and trip mechanism, or the pawl alone, may be used to great advantage even when the automatic hook-closing mechanism is not used.

What I claim is—

1. In combination, in a self-coupler, a draw-bar part, a coupling-hook pivoted at the end of the bar, locking mechanism for locking the hook when closed to the bar, and means for automatically holding the locking mechanism when disengaged from re-engagement before the cars separate and the hook opens, and that when the hook opens releases the locking mechanism to allow it to again act when the hook closes, substantially as described.

2. In a self-coupler, the combination of the stem A, the coupling-hook B, pivoted to the stem, and the key $e$, for locking the hook to the stem when closed, with the pawl $l$, for automatically holding the key when disengaged from re-engagement before the cars separate and the hook commences to open, substantially as described.

3. In combination, in a self-coupler, a draw-bar part, a coupling-hook pivoted at the end of the bar, locking mechanism for locking the hook when closed to the bar, and a detent for automatically holding the locking mechanism when disengaged from re-engagement before the hook opens, with trip mechanism for suspending the detent to release the locking mechanism as the hook opens, substantially as described.

4. In a self-coupler, the combination of the stem A, the hook B, pivoted to the stem, the key $e$, for locking the hook when closed to the stem, and the pawl $l$, for holding the key when disengaged from re-engagement before the hook opens, with the trip-finger $m$, for releasing the key by suspending the action of the pawl when the hook opens, substantially as described.

5. In combination, in a self-coupler, a draw-bar part, a coupling-hook pivoted at the end of the bar, and spring mechanism for automatically closing the hook, with locking mechanism automatically locking the hook as it closes, and detent mechanism automatically holding the locking mechanism when disengaged from re-engagement until the cars separate, when the opening of the hook releases the locking mechanism and enables the latter to again act when the hook closes, substantially as described.

6. In a self-coupler, the lever K, seated as to its shaft in the draw-bar A, the key $e$, sleeved on the square end of the shaft, and the pivot-bolt $b'$, also seated in the bar, shouldered against the end or passing through the shaft to hold the key thereon, and all these parts together, substantially as described.

7. In a self-coupler having a draw-bar part and a coupling-hook pivoted thereto, mechanism for locking the hook, seated in the draw-bar, a lever for disengaging the locking mechanism, attached to said locking mechanism, but outside of the bar, and uncoupling-levers (or lever) on the car joined to said disengaging-lever, combined with mechanism for automatically holding and releasing the locking mechanism, the combination operating so that the holding and releasing mechanism shall hold the locking mechanism when disengaged by the levers and release it again when the hook opens, substantially as described.

SYLVANUS D. LOCKE.

Witnesses:
JOHN P. LOCKE,
ELLEN J. LOCKE.